United States Patent Office 3,574,651
Patented Apr. 13, 1971

3,574,651
WATER BASED PAINT COMPOSITIONS CONTAINING AN ALKALI METAL ORGANOSILICONATE
Siegfried Nitzsche, Ewald Pirson, and Michael Roth, Burghausen, Upper Bavaria, Germany, assignors to Wacker-Chemie G.m.b.H., Munich, Bavaria, Germany
No Drawing. Filed Mar. 20, 1967, Ser. No. 624,171
Int. Cl. C08b *21/32;* C08g *47/00;* C09d *3/82*
U.S. Cl. 106—193          7 Claims

ABSTRACT OF THE DISCLOSURE

Compositions are disclosed which are useful as water based paints or which will form paints upon mixing with up to 80% water, which consist essentially of 18 to 100% by weight of a mixture of 0.07 to 1.0 part of alkali metal organosiliconate and 1.0 part by weight of pigment and up to 2% by weight of bonding agents other than alkali metal organosiliconates.

---

This invention relates to a novel paint composition. More particularly, this invention concerns a water based paint which can be pigmented with a wide variety of pigments and exhibit excellent weather resistance.

The use of organic solvent-soluble organosilicon compounds in paints and particularly as bonding agents in paints is known. However, the organic solvents required as carriers for these organosilicon compounds are frequently noxious and otherwise undesirable. It is also known to use water-dispersed or water-dissolved organic bonding agents in paints. Similarly, water glass with small quantities of alkali metal organosiliconates, particularly sodium methylsiliconate, or organosiloxane polymer emulsions or organosiloxane polymers in pulverulent solid form have been added to paints to improve the water stability of the coatings prepared from the paints. The effectiveness of these measures has not been wholly satisfactory.

It has also been known that unpigmented aqueous systems containing alkali metal organosiliconates can be employed as protective coatings on buildings. Such aqueous solutions of sodium methylsiliconates and other alkali metal organosiliconates were not, however, employed as pigmented paints wherein the siliconate was employed as a bonding agent. It has been generally accepted in the art that the alkali metal organosiliconates are not satisfactory as bonding agents in water based paints. This has been true even in those applications wherein substrates containing calcium hydroxide, e.g. fresh plaster or mortar, were to be painted.

It is the primary object of this invention to introduce a new aqueous system employed as a paint. A further object is an aqueous paint wherein alkali metal organosiliconates are the sole or primary bonding agents present. A novel paint exhibiting excellent weatherability, gas permeability, water repellency, resistance to chalking and useful on a wide variety of substrates is also an object of this invention. Other objects and advantages of this invention are detailed in or will be apparent from this disclosure.

The compositions of this invention which are paints per se or will form paints upon admixing them with water consist essentially of (a) up to 80 percent by weight of water, (b) 18 to 100 percent by weight of a mixture of 0.07 to 1.0 part by weight of alkali metal organosiliconate and 1.0 part by weight of pigment, and (c) up to 2 percent by weight of bonding agents other than alkali metal organosiliconates.

The compositions of this invention can be in the form of essentially water free powders which are mixed with water to form the desired pigmented paint which is then applied in the usual fashion. It is apparent the storage and transportation of dry powder is advantageous in contrast to the present paint systems wherein the water vehicle must be shipped and stored at considerable expense. Further, up to 50 percent of the water can be replaced by water-miscible, essentially inert organic solvents such as alcohols, e.g. methanol, ethanol, n- and isopropanol, as well as ketones such as acetone and methylethylketone. The use of organic solvent in the paint system may give improved stability. It is preferred to employ not more than 60 percent by weight of water or of water and organic solvent as the carrier herein.

The pigments employed herein include the broad range of organic and inorganic pigments known and used in the paint industry. Expediently the pigments employed are stable to alkaline conditions and to alkali metals, are not bonding agents and are not soluble beyond about 0.10 g. pigment in 100 g. of water at 20° C. Within the framework of this invention, the expression "pigments" includes fillers or extenders for pigments. Specific examples of pigments employed herein are alkali-earth carbonates such as chalk, magnesium carbonate, dolomite, precipitated calcium carbonate and barium carbonate, talcum, alumina hydrates, zinc oxide, magnesium oxide, fluorite, basic lead carbonate, white and colored pigments based on titanium dioxide, iron oxide red, iron oxide black, manganese black, carbons, barium yellow, strontium chromate, calcium chromate, zinc yellow, zinc green, cadmium yellow, cadmium red, cadmium vermilion, cadmopone, vermilion, ultramarine, lead chromate, chromium yellow, molybdate red, molybdate orange, chromoxide green, chromoxidehydrate green, manganese violet, manganese blue, cobalt blue, cobalt green, cobalt violet, naples yellow, and organic pigments of the azo series. The pigments listed above are merely illustrative of those employed herein as is well understood in the art. A more detailed description of the pigments employed herein can be obtained from Encyclopedia of Chemical Technology, Kirk-Othmer, Interscience Publishers Inc., New York (1953), volume 10, pages 612 et seq. The operable pigments are generally pulverulent solids and mixtures of pigments can be employed herein.

The alkali metal organosiliconates employed herein are compounds of lithium, sodium, potassium, rubidium and cesium. The best results are achieved with the potassium organosiliconates. The operable siliconates are known and include monomeric as well as polymeric compounds. The monomers are defined by the general formula $R_nSi(OR')_{4-n-m}(OM)_m$ where R is a monovalent hydrocarbon radical, R' is hydrogen or an alkyl radical of 1–6 carbon atoms, M is an alkali metal, $n$ is 0, 1 or 2 and has an average value of about 1.0, $m$ is 0, 1 or 2 and has an average value of about 1.0. The preferred monomers are of the formula $RSi(OH)_2(OM)$. The polymers can be prepared from the monomers by hydrolysis and condensation and are defined by the general unit formula $R_nSi(OR')_{4-n-m-2x}(OM)_mR''_x$— where R, R', M, $n$ and $m$ are as above defined and R" is an oxygen atom present as a siloxane linkage between adjacent silicon atoms or a di- or tri-valent hydrocarbon radical or hydrocarbon ether radical serving as a silcarbane linkage between adjacent silicon atoms. The preferred polymers are of the unit formula $R(MO)SiO$, wherein $x$ is $_{2/2}$ ($x$ can be $_{1/2}$, $_{2/2}$ or $_{3/2}$).

In the foregoing formula, R is a monovalent hydrocarbon radical bonded to silicon through a C-Si linkage. Preferably, R is a monovalent aliphatic hydrocarbon radical of 1–4 carbon atoms or a phenyl radical and most preferably R is a $CH_3$ radical. R can be illustrated by the following, alkyl radicals such as methyl, ethyl, n-propyl, isopropyl, n-butyl and sec-butyl as well as alkenyl radicals such as vinyl and allyl. The R radicals in each polymeric molecule can be the same or different. Preferably no tertiary carbon atoms in the alpha position to Si are present.

The siliconates employed herein can be alkoxylated alkali metal organosiliconates prepared from the distillation residue obtained from the reaction product of hydrocarbon halides and silicon in the known direct process preparation of hydrocarbonhalogenosilanes. These so called "direct process residues" are well known and are characterized in the organosilicon art (see e.g. U.S. Pat. No. 2,721,855, column 2, lines 14–29; U.S. Pat. No. 2,706,723, column 1, line 60—column 2, line 81). This direct process residue contains silcarbane linkage wherein silicon atoms are linked through polyvalent hydrocarbon radicals such as methylene, ethylene, polymethylene and phenylene as well as the expected siloxane linkages (SiOSi) and polysilane linkage (Si—Si). The nature of the preferred monomers and polymers herein is such that they are used in the form of aqueous solutions or dispersions.

The alkali metal organosiliconate is employed in proportions up to 1/1 on a parts by weight basis based on the weight of pigment employed. When the siliconate is added as a polymer, the molar weight of the siliconate is calculated on the unit weight of R(MO)SiO. The preferred range of proportions is from 0.07 to 1.0 part by weight of alkali metal organosiliconate per part by weight of pigment and exceptional results are achieved in the range 0.168 to 0.333 part siliconate per part by weight of pigment. In other words, the weight ratio of alkali metal organosiliconate to pigment is in the range from 1:1 to 1:4 and is preferably from 1:3 to 1:6. Expediently the ratio of alkali metal organosiliconate to pigment is in direct proportion to the water content of the paint within the limits given, that is the ratio is increased as the amount of water employed is increased.

The water and the alkali metal organosiliconate-pigment mixture are combined prior to processing the aqueous mass as a paint. The bonding agents other than the siliconate can then be added to the paint mixture. Any of the well-known bonding agents can be employed in amounts up to 2 percent by weight of the paint mixture. In addition, standard paint additives can be added up to a total of 2 percent by weight of the paint mixture (water plus siliconate and pigment).

Bonding agents which can be employed as noted above include methylcellulose, hydroxy methylcellulose, sodium salts of polyacrylic-, polymethacrylic acid and carboxymethylcellulose. These are believed to act as thickening agents herein rather than as bonding agents.

Other additives which are optional herein include emulsifiers such as sodiumtetradecylsulfate, materials to prevent settling and materials to prevent floating. Examples of such additives are reaction products of bentonite or montmorillonite and organic amine hydrochlorides or organic ammonium base hydrochlorides as well as trimethylsilyl endblocked dimethylsiloxane fluids of 5–100 cs. at 25° C.

The order of addition and mixing of the ingredients employed herein is of no consequence. The ingredients can be added and mixed in any desired order and in any desired manner. Any apparatus commonly employed for mixing paints can be employed herein.

The paints of the present discovery can be used for indoor and outdoor coatings, e.g. on plaster, that is, masonry coatings based on sand and hydraulic setting inorganic materials such as lime, cement and/or plaster, concrete, masonry of brick or natural stone, glass, asbestos cement, wood or metals such as iron. Surprisingly, the paints of the present discovery, contrary to unpigmented sodium organosiliconate solutions can also be applied to fresh finishes still containing calcium hydroxide. The paints can be applied in any desired manner such as by brushing, spraying or dipping.

The coatings will air dry at room temperature. Optionally the drying can also be done at lower temperatures or at temperatures up to 250° C.

Coatings obtained with the paints of the present discovery are characterized by high air permeability, high water vapor and carbonic acid permeability, by high water repellency, excellent weather resistance, heat and flame resistance, as well as resistance to chalking. Their great capacity for bonding pigments makes possible paints with wide coverage. Their heat stability is useful for coatings exposed to heat such as chimneys and heating ducts. On plaster, masonry, asbestos cement, and concrete such coatings serve as moisture protection at the same time.

The steps described in the following examples are always carried out at room temperature, when not stated otherwise, and the coatings are dried likewise, always at room temperature, as in the examples. These examples are included to assist those skilled in the art to understand and practice the invention. The invention is not limited by the scope of the examples but is delineated in the appended claims.

EXAMPLE 1

A solution of 300 g. of sodium methylsiliconate in 700 g. water was thinned with 300 ml. of water and mixed in a ball mill for five hours with a mixture of 400 g. pure rutile (titanium dioxide), 500 g. dolomite flour, 50 g. talcum and 50 g. chromoxide green.

With this paint a fresh lime cement plaster (two parts by volume lime hydrate, one part by volume cement and nine parts by volume sand) was coated twice. After two days the coating was waterproof and the plaster substrate was water repellent to a depth of 2 mm.

EXAMPLE 2

A solution of 660 g. of potassium methyl siliconate in 1340 g. water was thinned with 2,000 ml. water and mixed in a ball mill for 5 hours with a mixture of 750 g. barium carbonate, 1500 g. dolomite flour, 750 g. pure rutile, 600 g. talcum, 350 g. chalk, 20 g. iron oxide black and 30 g. dimethyldi-n-octadecylammonium bentonite (known under the registered mark "Bentone 34").

An iron sheet was painted twice with this material after thinning with a solution of 20 g. hydroxymethylcellulose in 1,000 ml. water. After two days the coated iron sheet was heated in a dry chest for 2½ hours at 200° C. and while it was still hot it was plunged into water at 12°. This heating followed by plunging into cold water was repeated ten times without subsequent peeling of the paint layer.

EXAMPLE 3

A solution of 150 g. potassium vinyl siliconate in 850 g. water was mixed for 5 hours in a ball mill with a mixture of 800 g. rutile, 1,000 g. dolomite flour, 100 g. talcum and 100 g. chromoxide green.

After thinning this material with 550 ml. water, two coats of it were applied to spruce wood. After three days the coating was fast to wiping and water repellent.

EXAMPLE 4

A solution of 280 g. sodium phenylsiliconate in 720 g. water was thinned with 600 ml. water and mixed with the pigment mixture described in Example 3 in a ball mill for 5 hours.

Spruce wood was given two coats with this paint. After three days the coating was fast to wiping and water repellent.

EXAMPLE 5

A solution of 370 g. potassium methylsiliconate in 630 g. water was mixed for 5 hours in a ball mill with a mixture of 1500 g. rutile, 500 g. magnesium carbonate, 900 g. chalk and 100 g. iron oxide red.

A spruce wood board was given two coats with the paint thus obtained. The coating of paint dried within two hours. During brief exposure to a flame from a Bunsen burner the coating merely darkened while an uncoated spruce wood board burst into flame under the same exposure to flame.

EXAMPLE 6

100 g. of potassium methylsiliconate were mixed in a ball mill for 5 hours with a mixture of 200 g. dolomite flour, 240 g. rutile and 60 g. iron oxide red.

Before the material was used as a paint it was diluted with 400 ml. water.

The following table gives the quantity ratios of the materials used in the previous examples for the preparation of the paints of the present discovery in the description preceding the examples and in the succession and method of calculation used in the claims.

bon, hydrogen and oxygen atoms present as ether linkages bonding silicon atoms in silicarbane linkage and $x$ has a value from 0.5 to 1.5 and an average value of about 1.0.

2. The composition of claim 1 wherein the alkali metal organosiliconate is a sodium methyl siliconate.

3. The composition of claim 1 wherein the alkali metal siliconate is of the unit formula $R_nSi(OM)_mO_x$ where R is an alkyl radical of 1–6 carbon atoms, an alkenyl radical of 1–6 carbon atoms or a phenyl radical, M is an alkali metal atom, $n$ has an average value of about 1.0, $m$ has an average value of about 1.0, and $x$ has an average value of about $2/2$.

4. The composition of claim 3 where R is methyl or vinyl, $m$ and $n$ are about 1.0 and M is K or Na.

| | Example 1 | | Example 2 | | Example 3 | | Example 4 | | Example 5 | | Example 6 | |
|---|---|---|---|---|---|---|---|---|---|---|---|---|
| Component | Grams | Weight percent | Grams | Weight percent | Grams | Weight percent | Grams | Weight percent | Grams | Weight percent | Grams | Weight percent |
| (a) Water | 1,000 | 43.5 | 4,340 | 48.0 | 1,400 | 39.5 | 1,320 | 36.5 | 630 | 16 | 400 | 40 |
| (b) I. Alkaliorganosiliconate | 300 | | 660 | | 150 | | 280 | | 370 | | 100 | |
| II. Pigments | 1,000 | | 3,970 | | 2,000 | | 2,000 | | 3,000 | | 500 | |
| Sum of I. and II. | 1,300 | 56.5 | 4,630 | 51.1 | 2,150 | 60.5 | 2,280 | 63.5 | 3,370 | 84 | 600 | 60 |
| | | | | | | | | | | | | (100) |
| (c) I.' Settling inhibitor | | | 30 | | | | | | | | | |
| II.' Hydroxymethylcellulose | | | 20 | | | | | | | | | |
| Sum of I.' and II.' | | | 50 | 0.5 | | | | | | | | |
| Sum of (a) plus (b) plus (c) | 2,300 | 100 | 9,020 | 100 | 3,550 | 100 | 3,600 | 100 | 4,000 | 100 | 1,000 | 100 |
| Parts, weight Alkaliorganosiliconate per parts, weight pigment | 0.33 | | 0.17 | | 0.075 | | 0.14 | | 0.12 | | 0.20 | |

EXAMPLE 7

Equivalent results were achieved when Example 1 was repeated employing 300 grams of any of lithium methylsiliconate, rubidium methylsiliconate, cesium methylsiliconate, sodium ethylsiliconate, potassium propylsiliconate, lithium butylsiliconate, a mixture of sodium methylsiliconate and lithium phenylsiliconate, a mixture of sodium vinylsiliconate and sodium butylsiliconate or cesium vinylsiliconate in place of the sodium methylsiliconate.

EXAMPLE 8

Equivalent results were achieved when Example 3 was repeated employing any of the pigments listed in Encyclopedia of Chemical Technology, by Kirk-Othmer at pages 612 et seq. in place of the rutile, dolomite flour, talcum and/or chromoxide green.

That which is claimed is:

1. A composition of matter suitable for use as a water based paint per se or suitable for forming water based paints by admixing with water consisting essentially of (a) 0 to 80 percent by weight of water, and (b) 18 to 100 percent by weight of a mixture of 0.07 to 1.0 part by weight of an alkali metal organosiliconate and 1.0 part by weight paint pigment, said alkali metal organosiliconate being defined by the general Formula 1

$$R_nSi(OR')_{4-n-m}(OM)_m$$

where each R is a monovalent hydrocarbon radical, each R' is an alkyl radical of 1 to 6 inclusive carbon atoms or a hydrogen atom, each M is Li, Na, K, Rb or Cs, $n$ is 0, 1 or 2 and has an average value of about 1.0, $m$ is 0, 1 or 2 and has an average value of about 1.0 or (2) the general unit formula $R_nSi(OR')_{4-n-m-2x}(OM)_mR''_x$ where R, R', M, $n$ and $m$ are as above defined and R" is a divalent oxygen atom linking silicon atoms in SiOSi linkage, a divalent hydrocarbon radical linking silicon atoms in silicarbane linkage or a divalent radical of car- 5. The composition of claim 1 wherein the pigment is chalk, magnesium carbonate, dolomite, precipitated calcium carbonate, barium carbonate, talcum, alumina hydrates, zinc oxide, magnesium oxide, fluorite, basic lead carbonate, titanias, iron oxide red, iron oxide black, manganese black, carbons, barium yellow, strontium chromate, calcium chromate, zinc yellow, zinc green, cadmium yellow, cadmium red, cadmium vermilion, cadmopone, vermilion, ultramarine, lead chromate, chromium yellow, molybdate red, molybdate orange, chromoxide green, chromoxide hydrate green, manganese violet, manganese blue, cobalt blue, cobalt green, cobalt violet, naples yellow, or an organic pigment of the azo series.

6. The composition of claim 1 further characterized in that the ratio of alkali metal organosiliconate to pigment is in the range from 1:3 to 1:6.

7. The composition of claim 1 further containing (c) not more than 2 percent by weight of a water dispersible or water soluble organic paint bonding agent selected from the group consisting of methylcellulose, hydroxy methylcellulose, alkali metal salts of polyacrylic acid and alkali metal salts of polymethacrylic acid.

References Cited

UNITED STATES PATENTS

| 2,507,200 | 5/1950 | Elliott et al. | 106—287C |
| 2,983,620 | 5/1961 | Haire | 106—287C |
| 3,009,829 | 11/1961 | Gouveia | 106—287C |
| 2,924,277 | 2/1960 | Shell et al. | 260—29.2M |

FOREIGN PATENTS

| 652,136 | 4/1951 | Great Britain | 106—287C |
| 916,245 | 1/1963 | Great Britain | 260—29.2M |

ALLAN LIEBERMAN, Primary Examiner

U.S. Cl. X.R.

106—170, 287, 316; 260—13, 29.2, 29.6